Sept. 16, 1941.  P. W. MATTHEWS  2,256,400

REEL

Filed April 2, 1940 7 Sheets-Sheet 1

INVENTOR.
PERCY W. MATTHEWS

BY

ATTORNEYS

Sept. 16, 1941.  P. W. MATTHEWS  2,256,400
REEL
Filed April 2, 1940  7 Sheets-Sheet 2

INVENTOR.
PERCY W. MATTHEWS
BY Richey & Watts
ATTORNEYS

Sept. 16, 1941. P. W. MATTHEWS 2,256,400
REEL
Filed April 2, 1940 7 Sheets-Sheet 4

INVENTOR.
PERCY W. MATTHEWS
BY Richey & Watts
ATTORNEYS

Sept. 16, 1941. P. W. MATTHEWS 2,256,400
REEL
Filed April 2, 1940 7 Sheets-Sheet 5

INVENTOR.
PERCY W. MATTHEWS
BY
Richey & Watts
ATTORNEYS

Sept. 16, 1941.  P. W. MATTHEWS  2,256,400
REEL
Filed April 2, 1940  7 Sheets-Sheet 6

INVENTOR.
PERCY W. MATTHEWS
BY
ATTORNEYS

Patented Sept. 16, 1941

2,256,400

UNITED STATES PATENT OFFICE 2,256,400

REEL

Percy W. Matthews, North Kingsville, Ohio, assignor to The Aetna Standard Engineering Company, Youngstown, Ohio, a corporation of Ohio Application April 2, 1940, Serial No. 327,483

17 Claims. (Cl. 242—78)

This invention relates to strip coiling apparatus and more particularly to certain improvements in tension reels for coiling strip material, such as metal, paper, fabric or the like as it comes from a prior processing operation.

In the manufacture of strip or the like the material is usually wound on to a reel or drum at various steps in the manufacturing operations. Driven reels have been provided which exert a tension on the strip being wound thereupon and which are so constructed that, after the strip is completely coiled, the reel may be collapsed to permit removal of the coil by sliding it off over the end of the reel.

The present invention relates to this general type of equipment, and it is among the objects of my invention to provide an improved collapsing and expanding reel which is of extremely rugged construction and which will withstand the very high compressive forces imposed on the reel by the cumulative action of the strip wound thereon. Other objects include: the provision of a reel having cam controlled means for expanding and collapsing the reel in which a large area of contact is maintained at all times between the cam surface and the expanding sections of the reel; the provision of a segmental reel of the type described having improved means for gripping and releasing the end of the strip; the provision, in a segmental reel, of floating pressure shoes which are interposed between the driving shaft and the floating segments, the contact area of said shoes with both the shaft and segments being adapted to distribute the load imposed thereon over a surface sufficiently large to prevent overloading of the parts or sticking or binding thereof and for more evenly distributing the load on the cam shaft; and the provision of means associated with the reel driving mechanism for preventing collapse of the reel when such collapse is not desired, together with means for automatically collapsing the reel when desired.

The above and other objects of my invention will appear from the following description of one embodiment thereof, reference being had to the accompanying drawings, in which—

Figure 1:
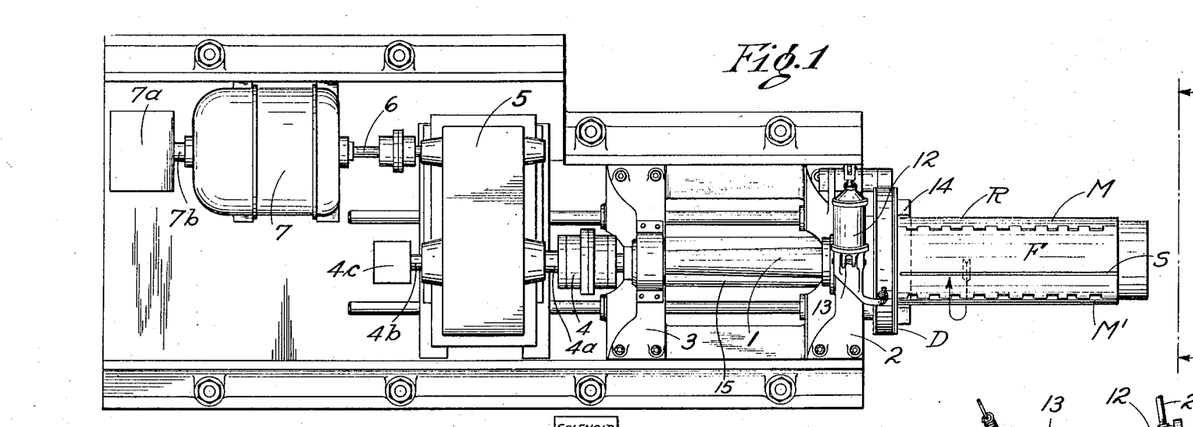
Figure 1 is an illustrative plan view of my improved reel together with the supporting and driving mechanism therefor.

Referring now to Figure 1, my improved reel is generally indicated at R. This reel, as will appear more fully later, is mounted on a shaft 1 which extends through and is supported in suitable bearings in the frame members 2 and 3. The shaft 1 is connected by a coupling 4 to the reduction gear box 5 from which a driving connection is made by the shaft 6 to the driving motor 7. It will be understood that suitable electrical controls will be provided for the motor 7 whereby it may be rotated in either direction. A magnetic brake 7a is shown mounted on the extended motor shaft 7b. A cam or other suitable type of limit switch 4c is mounted on extension 4b of the drum driving gear shaft 4a (see Fig. 1).

Speaking in general terms, the reel R includes a fixed segment generally indicated at F and two movable segments indicated at M and M'. The strip end slot S extends from the free end (seen at the right in Figure 1) of the reel to the inner end thereof. At the inner end of the reel R is a brake drum element D encompassed by the brake band B one end of which is anchored at one end to the lever 9 and the other end of which is secured by a link 8 (see Fig. 2) to the lower end of the operating lever 9 which is pivoted to the frame at 10. A compression spring B' tends to move lever 9 in brake releasing direction. The upper end of lever 9 is connected to the piston rod 11 of the brake actuating air cylinder 12. A floating support for the cylinder 12 is provided at 13 on the frame of the machine and a supply of operating fluid pressure, from any suitable source, is conducted to the cylinder 13 through a pipe 20 in which the valve 18 is interposed as later explained.

The general mode of operation of my reel will now be explained prior to describing the specific structural details thereof, as it is believed that such an explanation will assist in understanding the functions of the various parts later to be described.

Figure 2:
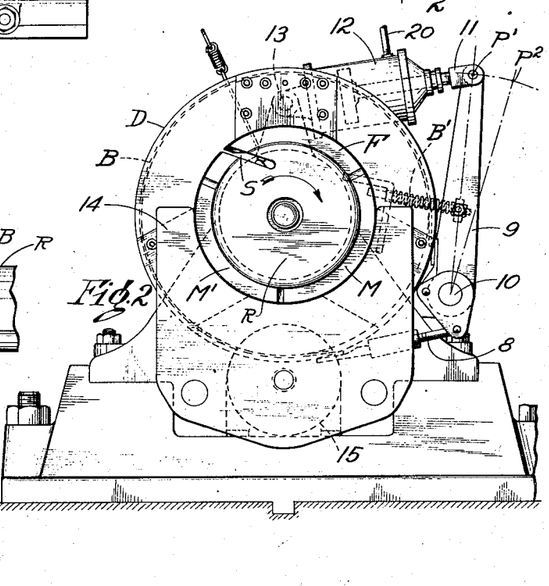
Figure 2 is an enlarged end elevational view of the apparatus shown in Figure 1 taken substantially on line 2—2 of Figure 1.

The movable segments M and M', when in the expanded position as shown in Figures 1 and 2, form a cylindrical drum with the fixed segment F. When the movable segments M and M' are collapsed they move radially inwardly thus reducing the effective diameter of the drum or reel and permitting the removal of the coil. When starting operations the end of a strip is inserted in the slot S, the brake band B gripping the drum D and preventing rotation of the reel segments while permitting limited movement of the shaft 1, as will appear more fully later. When the motor 7 is started to drive the shaft 1 and reel R in the direction indicated by the arrows in Figures 1 and 2, the electrical connections shown in Figure 3 cause the brake band to be released after the strip end is gripped in the slot S. The movable segments M and M' are held in their expanded position, and the winding continues until the coiling is completed. When the motor 7 is shut off suitable connections, such as those shown in Figure 3, will cause the brake operating mechanism to apply the brake to the drum D thus preventing the segments F, M and M' from rotating. Now, if it is desired to remove the coil from the reel, the shaft 1 is moved in reverse direction from that shown by the arrows in Figures 1 and 2 and this operation results in the retraction or collapse of the movable segments M and M', permitting the coil to be pushed off over the free end of the reel by means of a longitudinally movable yoke member 14 mounted on suitable slides on the machine frame and operable by any means, such as the air cylinder indicated at 15 in Figure 2.

Figure 3:
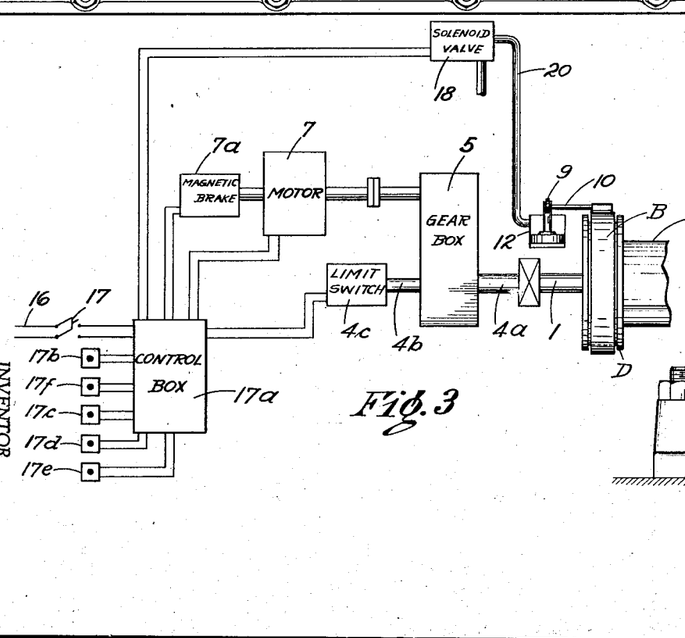
Figure 3 is a diagrammatic layout illustrating a hook-up between the reel driving motor and the brake operating mechanism whereby undesired collapse of the reel is prevented when the coiling operation is interrupted and to provide automatic collapse of the reel when desired.

In diagrammatic Figure 3 the current supply for the motor 7 comes from the line 16 through the switch 17 to control box 17a which contains the various controls for the motor, solenoid valve, magnetic brake, etc. As the structural arrangement of these controls forms no part of the present invention they are not illustrated in detail herein and it will suffice to point out that any suitable arrangement of relays, contactors, etc., may be employed. Electrical connections are made from the control box to the motor 7, the magnetic brake 7a, the limit switch 4c, and the solenoid valve 18 through the wires indicated on Figure 3. A reverse control button 17b is adapted to reverse the rotation of the motor 7 when desired, push buttons 17c and 17d are connected to the line 16 through the control box 17a in such a manner that they may be employed respectively to apply and release the brake band B at the will of the operator, and push buttons 17e and 17f are the normal start and stop buttons.

In the normal operation of my improved apparatus, when the reel R is stationary the brake B is applied to the drum D. After a strip end is inserted in the slot S, assuming that the switch 17 is closed, the operator pushes the start button 17e, which, through the control box 17a, starts the motor in a series of accelerating steps. On the first step the brake band B is kept applied thus causing the cam shaft 1 to move relative to the segments of the reel and effecting gripping of the strip end and expansion of the reel, as will appear more fully later.

The reeling operation then proceeds until the strip is wound, whereupon the operator pushes the stop button 17f causing the motor to pass through a series of decelerating steps, actuating the solenoid valve 18 to apply the brake band B to drum D and cutting off the current from magnetic brake 7a.

Before the motor 7 finally stops rotating, preferably on the last decelerating step, current to the motor 7 and the magnetic brake 7a, is caused to pass through the limit switch 4c in such a manner that the motor rotates at a low speed and the magnetic brake is held in the off position. Upon the slot S reaching a predetermined loading position the limit switch cuts the current off the motor and magnetic brake, applying the brake and stopping the motor. Current has been caused to flow to solenoid valve 18 on the first decelerating step so that brake B has been applied during deceleration of the motor, causing the motor to drive the reel throughout the decelerating period to prevent collapse of the reel. Current is held on the solenoid valve 18 until the operator starts a fresh cycle of operations by pressing the start button 17e. After the reel has come to rest the operator pushes the reversing button 17b which causes current to flow through the limit switch to motor 7 rotating it backwards through 45°, which 45° movement is governed by the limit switch, and which movement collapses the segments and releases the strip, as will appear more fully from the later description of the structural details of my reel.

The auxiliary push buttons 17c and 17d control the operation of the brake band B independently of the push buttons 17e and 17f. By means of these auxiliary controls the operator can apply and release the brake band B at any time. This control is particularly effective in permitting the operator to cause the reel to collapse before it stops rotating. This is done by releasing the brake B and applying magnetic brake 7a and permitting the reel and coil to overrun the shaft 1. When so operated the reel is collapsed before it comes to rest and the coil can be immediately removed without having to reverse the motor. Spring B' throws the brake lever 9 from its brake applied position P' (Fig. 2) into position P² releasing brake band B from drum D.

Figure 4:
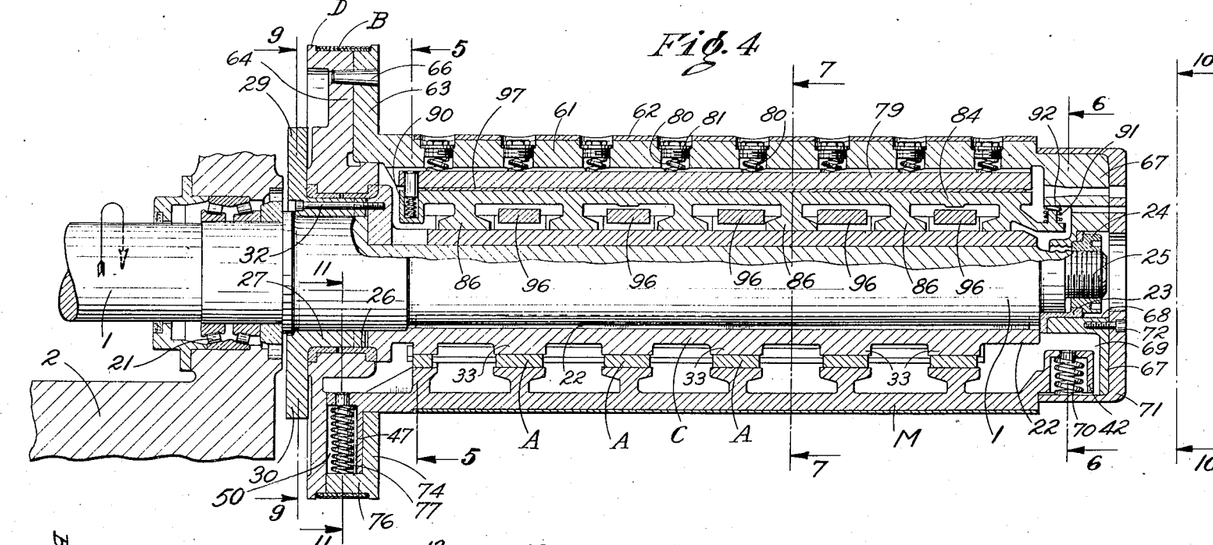
Figure 4 is a longitudinal cross-sectional view of my improved reel taken on the irregular line indicated at 4—4 on Figures 7 and 10.
Figure 5:
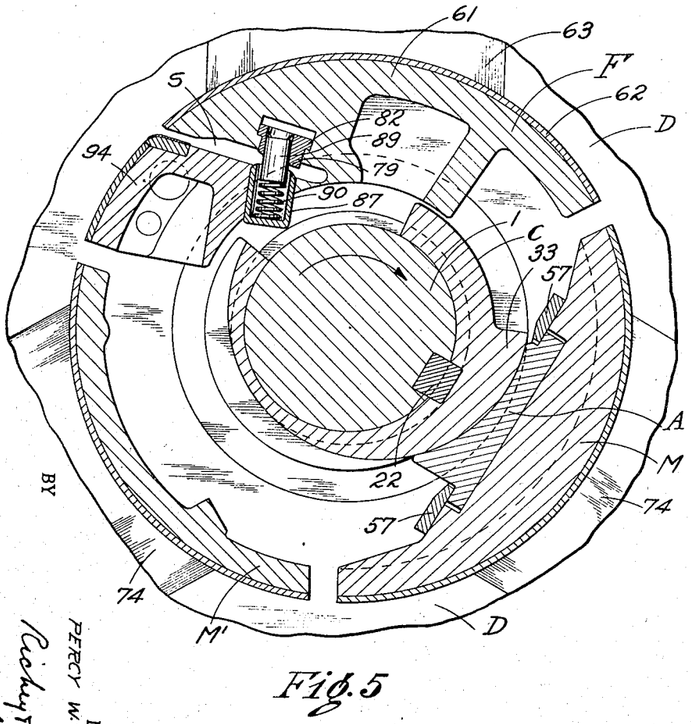
Figure 5 is a transverse vertical cross-sectional view taken on line 5—5 of Figure 4.
Figures 10, 15, 16:
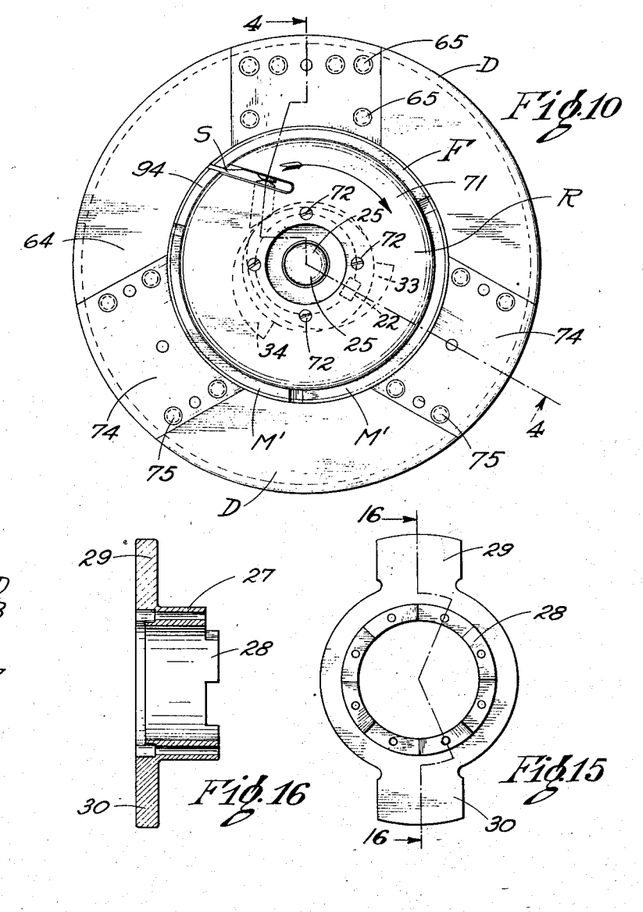
Figure 10 is an end elevation of my reel structure taken on line 10—10 of Figure 4.
Figure 15 is an end elevation of the reel driving member which is attached to the end of the cam sleeve.
Figure 16 is a cross-sectional view taken on line 16—16 of Figure 15.
Figure 12:
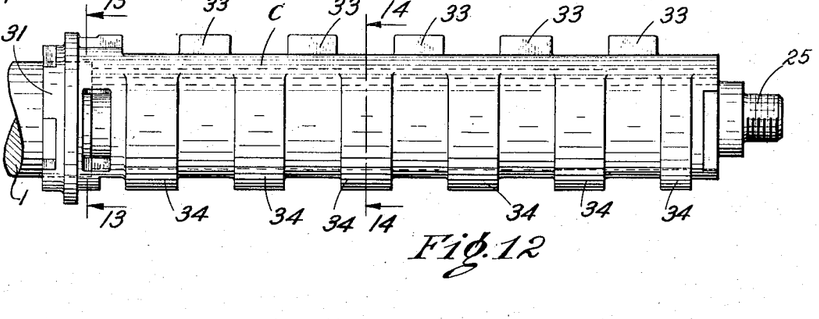
Figure 12 is a detached side elevation of the cam and drive shaft assembly.
Figure 13:
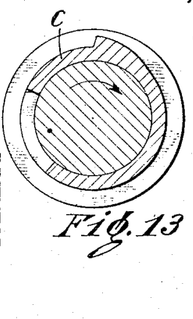
Figure 13 is a vertical cross-sectional view taken on line 13—13 of Figure 12.
Figure 14:
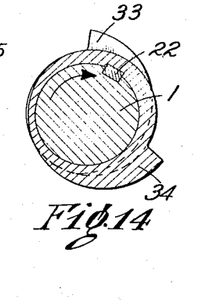
Figure 14 is a vertical cross-sectional view taken on line 14—14 of Figure 12.

Referring particularly to Figure 4, it will be seen that the shaft 1 is supported in the bearing 21 in the frame 2. A cam sleeve, generally indicated at C, and shown in detail in Figures 12, 13 and 14, is supported by the overhanging end of the shaft 1 and is secured thereto for rotation therewith by means of a key 22. A bearing bushing 23 is supported on the outer end of the shaft 1 and locked against the outer end of the cam sleeve C by means of the retaining nut 24 on the threaded end 25 of the shaft 1. A second bearing bushing 26 has a press fit in the bore of face plate 64, engages the inner end of the cam sleeve C and is rotatably supported on the sleeve portion 27 of the reel driving member. As best seen in Figures 15 and 16, this driving member is provided with teeth 28 on the end of the sleeve 27 and oppositely disposed radially extending driving lugs 29 and 30. The teeth 28 engage with corresponding teeth or jaws 31 on the inner end of the cam sleeve C and are held in engaged position therewith by means of the screws 32. From the above description it will be seen that the cam sleeve C, bushing 23, driving member sleeve 27, and driving lugs 29 and 30 are secured to and rotate with the shaft 1. Bushing 26, as shown, rotates with the face plate 64.

Two sets or series of segment actuating cam surfaces are formed on the cam sleeve C. As is best seen in Figures 12, 13 and 14, one set of these cams 33 are radially offset from, and axially staggered in relation to, the other set of cams 34. Each cam element 33 and 34 is provided with a working surface which becomes progressively more remote from the center of the shaft 1. These cam surfaces are arcs of circles, the center of the arc describing one of the cams 34 being shown at C in Figure 7. The function and operation of the cam surfaces will appear later, but it may be pointed out that the cams 33 actuate the movable segment M and the cams 34 similarly and simultaneously actuate the movable segment M'. It will be understood that, if desired, the cam surfaces may be formed integrally with the shaft 1 and I do not wish to be limited to the built-up structure herein described and illustrated.

As the movable segments M and M' are substantially identical it will suffice to describe the element M in detail and similar reference characters will be employed to refer to similar parts in connection with the movable segment M'.

Referring to Figures 29 to 32, the segment M includes a curved shell portion 35 faced with a suitable wear resisting cover plate 36. Cast with the shell 35 are a plurality of axially spaced inwardly extending webs 37 each of which carries a transversely extending flange portion 38 having a flat bearing surface 39. The edges of the cylindrical shell 35 are notched or toothed as seen at 40 and 41. These teeth are so disposed on the elements M, M' and F that they interlock and preserve the continuity of the cylindrical reel surface while permitting collapse and expansion of the movable segments M and M'. The interengagement of these serrated edges is clearly seen in Figures 7 and 8. At the outer end of the segment M is a projecting guide member 42 provided with opposite parallel guiding surfaces 43 and 44. A cup 45 is formed in the guide member 42 and a stud 46 in the bottom of the cup 45 is adapted to center the spring 70 which is disposed in this cup and which will be described later. At the inner end of segment M is a second guide member 47 provided with parallel guiding faces 48 and 49. A recess 50 is formed in the member 47 and the stud 51 in the bottom of this recess locates another segment retracting spring 77 which also will be described later.

Figures 21, 22, 23:
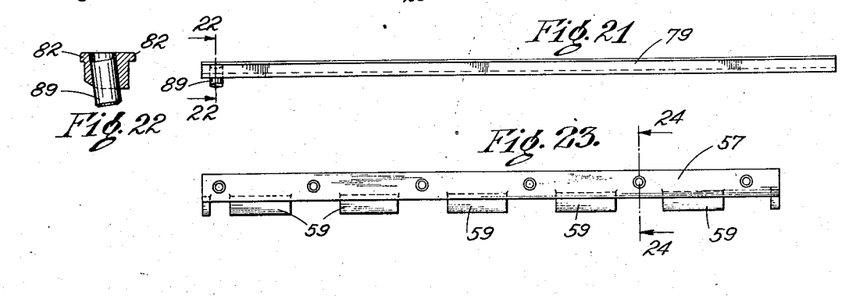
Figure 21 is a detached elevational view of the outer grip stripper bar.
Figure 22 is a cross-sectional view taken on line 22—22 of Figure 21.
Figure 23 is a detached elevational view of the shoe retaining bar.
Figure 24:
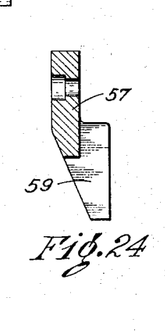
Figure 24 is an enlarged cross-sectional view taken on line 24—24 of Figure 23.
Figures 25, 26, 27, 28, 29, 30, 31, 32, 33:
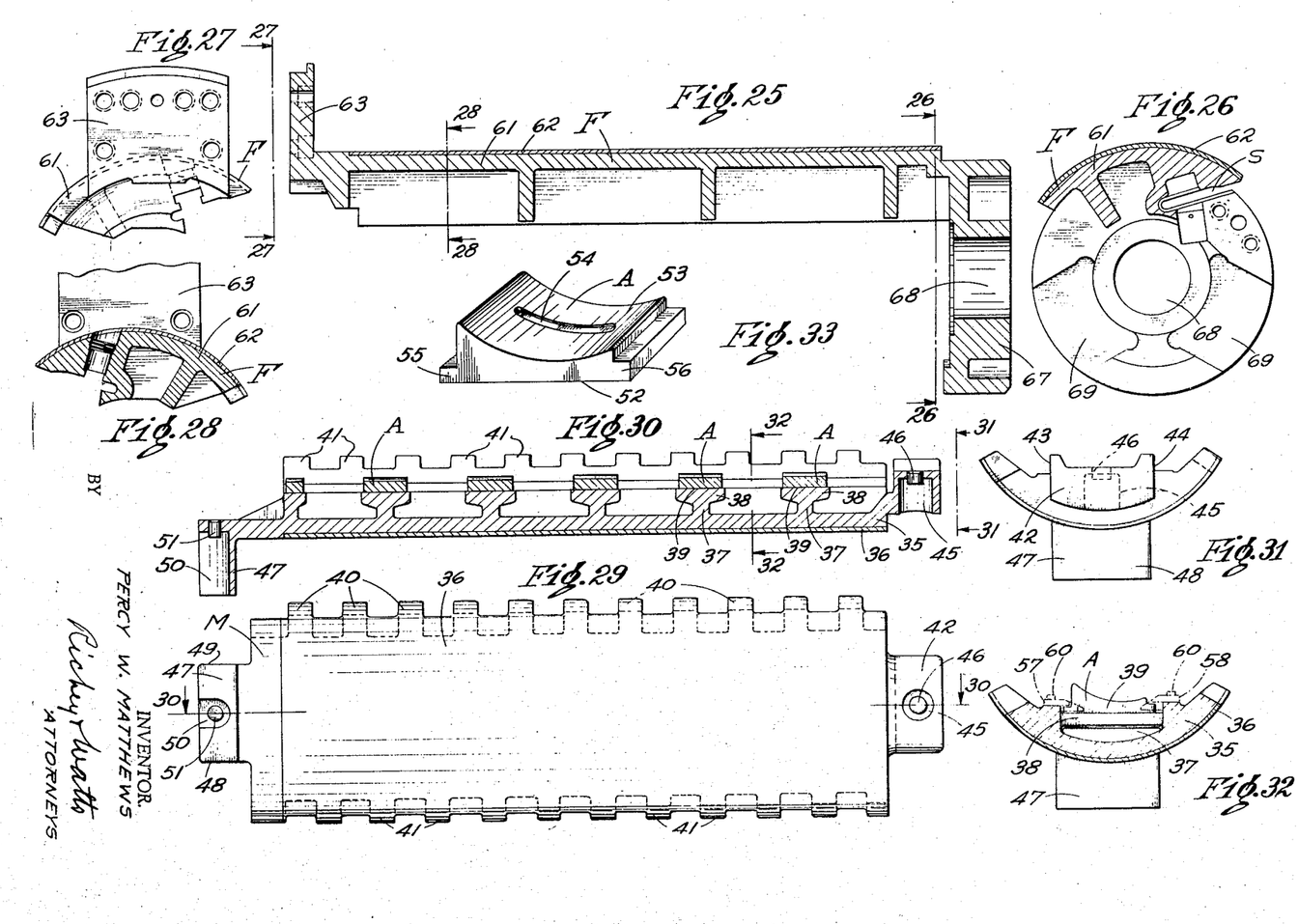
Figure 25 is a detached longitudinal sectional view of the fixed segment member.
Figure 26 is a cross-sectional view taken on line 26—26 of Figure 25.
Figure 27 is an end elevation of the element shown in Figure 25, taken on line 27—27 of Figure 25.
Figure 28 is a cross-sectional view taken on line 28—28 of Figure 25.
Figure 29 is a detached plan view of one of the movable segment members.
Figure 30 is a longitudinal section of the movable segmental member, taken on line 30—30 of Figure 29.
Figure 31 is an end elevation of the movable segment taken on line 31—31 of Figure 30.
Figure 32 is a cross-sectional view of a movable segment with a pressure shoe assembled therewith, taken on line 32—32 of Figure 30.
Figure 33 is a detached perspective view of one of the pressure shoes or slippers.

Associated with each of the flanges 38 and their bearing faces 39 is a pressure shoe or slipper A, one of which is shown in detached view in Figure 33. In Figures 30 and 32 these shoes are also shown in their assembled positions on the movable segment M. The flat bearing faces 52 of the slippers A engage the surface 39 of the flanges 38 and the curved bearing surfaces 53 of these slippers engage the cam surfaces 34. Suitable oil grooves 54 are provided in the faces 53 and 52 and each slipper is formed with end flanges 55 and 56. These end flanges are engaged by the shoe retaining bars 57 and 58, the bar 57 being shown in Figures 23 and 24. Spaced projecting portions 59 of the bars 57 and 58 prevent axial movement of the slippers A and the bars themselves retain the slippers in position on the faces 39 during assembly but do not restrict sliding movement of the slippers on the cam surfaces 34 or the bearing faces 39. Screws 60 secure the bars 57 and 58 to the segment M, as is seen in Figure 32.

The fixed segment F has a curved shell portion 61 provided with a cover plate 62 and the radially projecting flange 63 is attached to the face plate member 64 by screws 65 and is located by a dowel pin 66 (see Figs. 4 and 10). The outer end of the segment F is in the form of a drum 67 having a central bore 68 (see Figs. 4 and 25) which has a bearing upon the bushing 23. Thus, it will be seen that the assembly of the segment F and the face plate 64 has a bearing at the inner end on the sleeve 27 and at the outer end on the bushing 23 and is therefore rotatable relative to the shaft 1.

Figure 6:
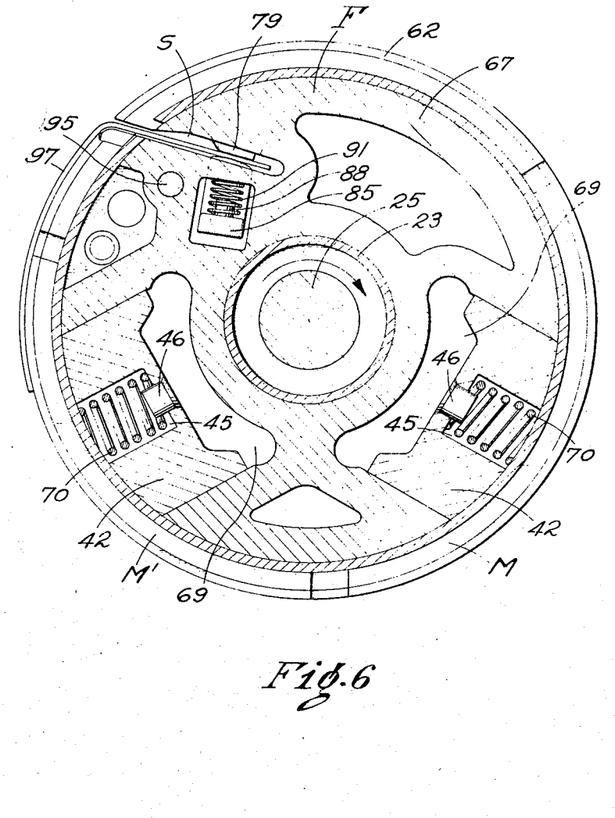
Figure 6 is a transverse vertical cross-sectional view taken on line 6—6 of Figure 4.

The inner face of the drum end 67 of segment F is provided with recesses 69 for the end guide members 42 of the movable segments M and M'. As is seen in Figure 6, the side faces of the recesses 69 engage and guide the faces 43 and 44 of the end guides 42 of the movable segments. Retracting springs 70 are located in the recesses 45 on the pins 46 and are maintained in compression with their outer ends engaging the inner surface of the end cap 71 which fits over and is secured to the outer drum 67 by screws 72. Thus, the springs 70 always exert a force tending to move the guide members 42 and the movable segments M and M' radially inwardly.

Figure 11:
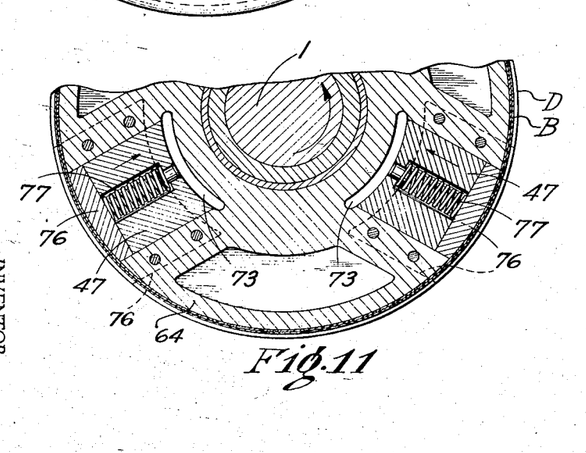
Figure 11 is a fragmentary vertical cross-sectional view taken on line 11—11 of Figure 4.

The inner end guide members 47 of the movable segments are slidingly supported in radially extending recesses 73 in the face plate 64 (Fig. 11). These recesses are provided with retainer covers 74 (Fig. 10) secured in place by screws 75 and provided with axially extending webs 76 which serve as abutments for the outer ends of the springs 77 and also complete the brake drum surface, as seen in Figure 11. The springs 77 are disposed in the pockets or recesses 50 of the end guides 47 and are located at their inner ends by the pins 51. As these springs are compression springs and abut against the radially immovable webs 76 they exert a force tending to move the inner ends of the retractable segments M and M' radially inwardly. Thus, the springs 70 and 77 act together on the opposite ends of the movable segments M and M' to move them out of their expanded position into retracted position whenever the cam C will permit such movement.

Figure 9:
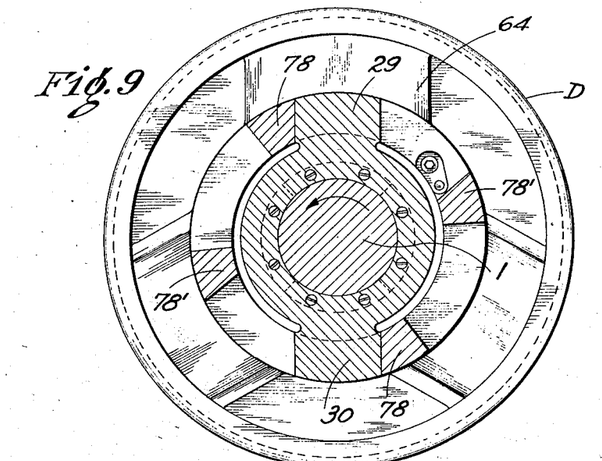
Figure 9 is a transverse vertical cross-sectional view taken on line 9—9 of Figure 4.
Figures 17, 18, 19, 20:
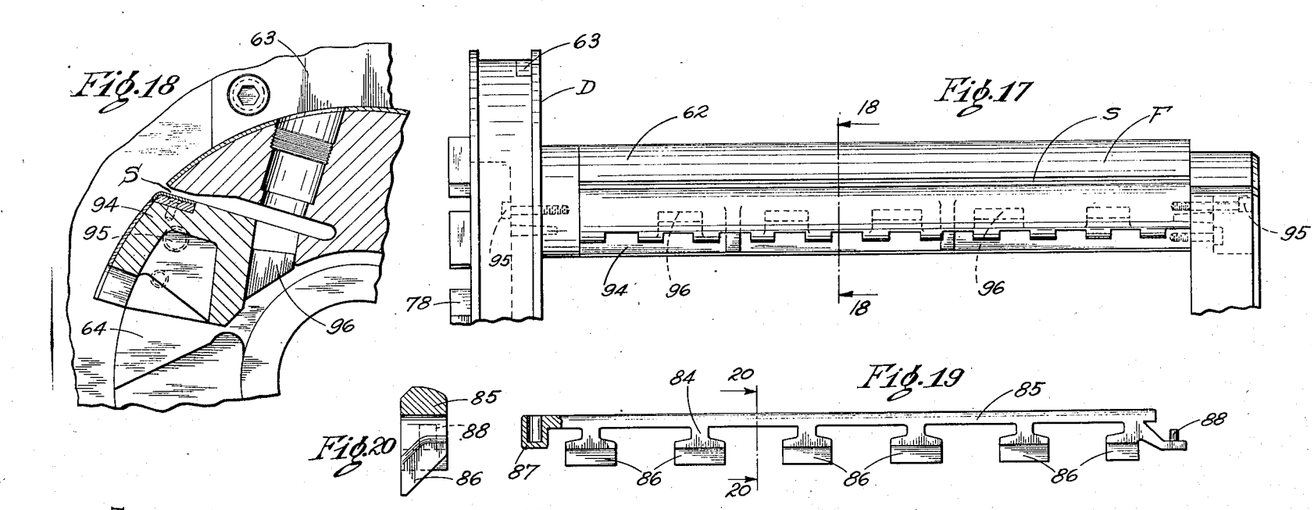
Figure 17 is a detached fragmentary side elevation of the brake drum, fixed reel segment, and end cap assembly.
Figure 18 is a cross-sectional view taken on line 18—18 of Figure 17.
Figure 19 is a detached side elevation of the inner strip gripper bar.
Figure 20 is a cross-sectional view taken on line 20—20 of Figure 19.

As is seen in Figures 9 and 17 the surface of the face plate 64 adjacent the frame 2 is provided with projecting lugs 78 and 78'. These lugs are positioned to be engaged by the driving lugs 29 and 30 which are secured to the cam sleeve C and which rotate with the shaft 1. The engagement with the lugs 78 is shown in Figure 9. The shaft 1 rotates in the direction of the arrow when driving the reel and thus drives the face plate 64 and the segmental sections of the reel. The lugs 78' are so positioned that they permit the shaft 1 and the cam C to be moved 45° in clockwise direction (Fig. 9) before the lugs 29 and 30 engage the lugs 78'. This 45° movement of the shaft and cams relative to the face plate and segments permits the movable segments to be retracted or collapsed, as is later explained.

The fixed segment F and the end cap 71 each include the strip slot S. Associated with this slot for gripping the end of the strip 97 during the winding operation is an outer gripping bar 79 disposed in an elongated slot in member F and supported and backed up by a plurality of relatively stiff springs 80. These springs are located in recesses extending through the outer face of segment F (Fig. 4) and are retained in position by screw plugs 81. The bar 79 is provided with flanges 82 which engage shoulders 83 on the fixed segment F thus limiting the inward movement of the bar 79. The co-acting inner gripping bar 84 is best seen in Figures 2, 7, 8, 19 and 20. It includes a strip engaging portion 85 and a plurality of cam engaging feet 86 and is mounted in a longitudinally extending slot in the fixed segment F and is adapted to move toward and away from the outer bar 79. The feet 86 are spaced to engage the cams 34 and are adapted to be actuated thereby. It will also be noted that the feet 86 engage the cams 34 between the rows of slippers A (Fig. 7) for the two movable drum segments. Thus the loads on the shaft 1 are substantially uniformly distributed and, if desired a still more nearly uniform distribution can be obtained by deepening the slot S and moving the bar 84 to the right (Fig. 7) until it is midway between the radii on which segments M and M' move. At the inner end of the bar 84 is a spring cup 87 and at the outer end is a guide pin 88. The plunger 89 on the inner end of the bar 79 fits in the cup 87 and a spring 90 (see Fig. 4) tends to move the bars 79 and 84 apart. Another spring 91 is located on the pin 88 at the outer end of bar 84 and abuts against a suitable surface 92 in the outer drum portion 67 of the fixed segment F. This spring 91 co-acts with the spring 90 to urge the bars 79 and 84 apart and to maintain the cam engaging feet 86 in contact with the cam surface 34.

Figure 7:
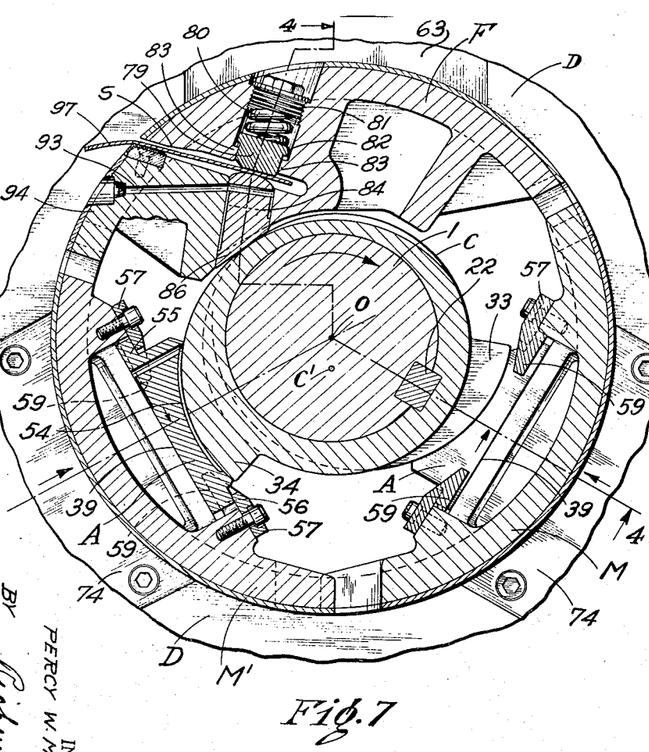
Figure 7 is a transverse vertical cross-sectional view taken on line 7—7 of Figure 4 and illustrating the reel parts in expanded position.

Lubrication for the bar 84 may be provided through a hole 93 and suitable oil grooves and passages in the bar itself (Fig. 7). The portion of the fixed segment F which defines the lower side of the slot S, as seen in Figures 5, 7, 8 and 18, is a separate part which is secured at one end to the face plate 64 and at its opposite end to the drum portion 67 of the segment F. This anvil block member is indicated at 94 on the drawings and it completes the longitudinal groove in the segment F in which the inner gripping bar 84 is disposed. Screws 95 hold the anvil block 94 in position and projecting lugs 96 lie between the feet 86 of the inner gripping bar 84 and serve to support the anvil block 94 and also to prevent undesired longitudinal movement of the bar 84, it being noted in Figure 4 that the second and third lugs 96 from the right hand end are spaced to engage the ends of the foot 86 disposed therebetween.

The operation of my improved reel is as follows:

Assuming that the shaft 1 and cam C, together with the driving lugs 29 and 30, are in the position shown in Figure 9, the lugs 29 and 30 engaging the lugs 78, then the other parts of the reel will be in the positions shown in Figure 7. The gripping bars 79 and 84 are gripping the end of the strip 97 and the cams 33 and 34 hold the slippers or shoes A in their outermost positions, it being noted that the full area of the curved surfaces 53 of the slippers are engaged by the cams and the full area of the flat surfaces 52 of the slippers are engaged by the flat bearing surfaces 39 of the movable segments M and M'. These flat faces are longer than the corresponding faces of the slippers (see Fig. 7) and thus permit sliding movement therebetween and it is this feature which makes possible the maintenance of the desired large supporting area between the movable segments M and M' and the cam C and shaft 1.

Just after the motor 7 is started the brake band B is released and the segments F, M and M' will be driven through the lugs 78 to rotate the reel in the direction of the arrow (Fig. 7) thus winding the strip upon the reel. When the winding is completed the motor 7 is stopped and the brake band B is applied to the drum D, as previously described, to lock the segments against rotational movement. The shaft 1 is then moved in the reverse direction from that shown by the arrow in Figure 7, by reversing the motor or by other suitable means. Forty-five degrees of this reverse rotational movement of the motor 7, shaft 1 and the cam sleeve C is permitted by a suitable limit switch (not shown) before the lugs 29 and 30 strike the lugs 78' (see Fig. 9). After this reverse rotational movement is completed the parts will assume the positions shown in Figure 8, it being noted that the gripping bar 84 has been permitted to move inwardly to release the stock end and the segments M and M' have moved radially inwardly guided by their end guide members 42 and 47.

Figure 8:
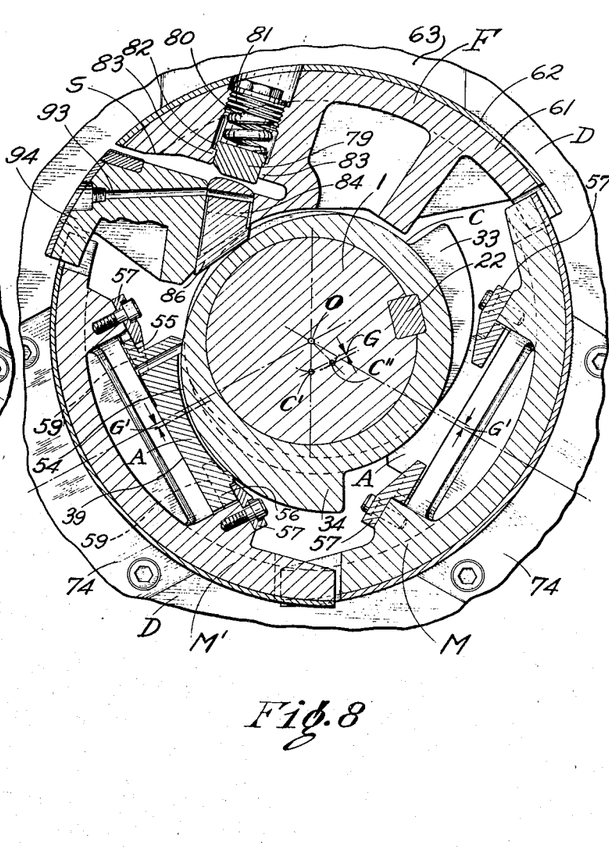
Figure 8 is a view similar to Figure 7 but illustrating the reel parts in collapsed position.

During the 45° reverse rotation of the shaft 1 the center of the arcuate cam surface of cam 34, which is indicated in Figures 7 and 8, moves from the position C' of Figure 7 into the position C'' of Figure 8. It is observed that during this movement the cam center moves away from the center O of the shaft I by a distance indicated at G on Figure 8. In order that the bearing surfaces of the slipper A may remain in full contact with both the cam surface 34 and the bearing surface 39 of the movable segment during this movement of the center of curvature of the cam, the slipper A must move longitudinally over the surface 39 a distance equal to the distance G. This movement is indicated at G' on Figure 8 and it is by this sliding of the slipper A on the surface 39 that I am able to maintain the large pressure sustaining areas between the movable segments and the inner supporting cam C. In previous expanding reels with which I am familiar in which cams have been used for expanding and contracting the segments line contact has had to be maintained between the cam surfaces and the segments. Such line contact, of course, presents only a minimum of supporting area and it will be observed that my improved floating slipper arrangement completely overcomes the defects of such line contact devices.

After the reel has been collapsed into the position shown in Figure 8 the coil may be slippped off over the unsupported end of the drum and, as the gripper bars 84 and 79 are now spaced apart, as seen in Figure 8, the end of a new strip may readily be inserted into the slot S. The shaft I is then turned in driving direction 45° during which movement the bar 84 is moved outwardly to grip the strip against the resiliently supported bar 79 and the cams 34 and 33, acting through the slippers A, move the segments M and M' radially outwardly into the position shown in Figure 7. During this operation rotation of the segments is prevented and the slippers A move back over the surfaces 39 from the position shown in Figure 8 into those shown in Figure 7. Further rotation of the shaft I by the motor 7, after release of the brake, will wind the strip on the reel and the compressive loads imposed on the segments M and M' by the strip will be transmitted through the shaft to the large bearing surfaces provided by the plurality of slippers A engaging the plurality of cam surfaces 33 and 34. The crushing loads imposed by the strip are readily sustained by these large bearing areas and the difficulties and defects of prior devices are completely overcome. An extremely rugged reel is provided by my improved construction which has proved to be entirely successful in production operation in strip steel mills.

Although I have described the illustrated embodiment of my invention in considerable detail, it will be understood that numerous variations may be made in the form and arrangement of the parts employed, for example, a greater number of movable segments might be used, and I do not, therefore, wish to be limited to the specific reel structure herein shown and described, but claim as my invention all embodiments thereof coming within the scope of the appended claims.

I claim:

1. In a reel of the type described, a plurality of segment members, a shaft, means for supporting said segments on said shaft, one of said segments being fixed insofar as radial movement toward and away from the center of said shaft is concerned, another of said segments being movable on a true radial line relative to the center of said shaft, a cam surface carried by said shaft, said cam surface being eccentric relative to the shaft center, and a slipper member disposed between said cam surface and said movable segment and having substantial surface areas in contact at all times with both said cam and movable segment.

2. In a reel of the type described, a shaft, a movable segment supported for movement on a true radius of said shaft, resilient means tending to move said segment inwardly toward the shaft center, cam means for moving said segment on a radial line outwardly upon relative rotation of said shaft and segment in one direction and permitting said segment to be moved radially inwardly on relative rotation of said shaft and segment in the opposite direction, and a slipper member between said cam and segment, said slipper having a curved surface engaging a corresponding curved surface on said cam and a flat surface engaging a corresponding flat surface on said segment.

3. In a reel of the type described, a shaft, a movable segment supported for movement radially of said shaft, resilient means tending to move said segment inwardly toward the shaft center, cam means for moving said segment radially outwardly upon relative rotation of said shaft and segment in one direction and permitting said segment to be moved radially inwardly on relative rotation of said shaft and segment in the opposite direction, and a slipper member between said cam and segment, said slipper having a curved surface engaging a corresponding curved surface on said cam and a flat surface engaging a corresponding flat surface on said segment, the curved surface of said cam being eccentric to the shaft center and the flat surface of said segment extending substantially perpendicularly to the line of radial travel of said segment whereby, when said shaft is rotated relative to said segment, said slipper will move on the flat surface of said segment and will remain in full contact with both the cam and segment.

4. In a reel of the type described, a driving shaft, a cam surface rotatable with said shaft, a fixed segment supported by said shaft, means for driving said fixed segment in one direction by said shaft, said means being adapted to permit relative rotation of said shaft and fixed segment in the opposite direction, a movable segment supported on said shaft and movable radially thereof, a slipper member disposed between said movable segment and said cam surface, said slipper having a surface extending perpendicularly to the radial line of movement of said movable segment and engaging a corresponding surface on said movable segment and having a second surface contoured to fit and engaging said cam surface, said slipper having a floating support between said movable segment and cam whereby, when said cam surface is rotated relative to said segments, said slipper may move on said movable segment while remaining in full contact with both the cam surface and movable segment.

5. In a reel of the type described, a shaft, means for driving said shaft, a face plate rotatably mounted on said shaft and having an extending lug, a driving lug projecting from said shaft and adapted to have driving engagement with said face plate lug, a fixed segment secured at one end to said face plate and having a drum portion at its opposite end, said drum portion being rotatably mounted on said shaft, a pair of movable segments each supported and guided at one end for movement along a radius of said shaft by said face plate and at the other end by said drum portion, a cam rotatable with said shaft and disposed between said face plate and said drum portion, a series of cam surfaces on said cam, a second series of cam surfaces on said cam axially staggered and angularly displaced from said first named series, one of said cam surface series being positioned to move one of said movable segments and the other of said cam surface series being positioned to move the other of said movable segments, load transmitting slippers or shoes between said cam surfaces and said movable segments, said slippers being supported for movement at right angles to the radii on which their respective movable segments move, and means for maintaining said cam surfaces and segments in engagement with said slippers.

6. In a reel of the type described, a plurality of segment members, a shaft, means for supporting said segments on said shaft, one of said segments being fixed insofar as radial movement toward and away from the center of said shaft is concerned and another of said segments being radially movable on a true radius of said shaft toward and away from the center of said shaft, a cam surface carried by said shaft, said cam surface being eccentric relative to the shaft center, a slipper member movable relative to said movable segment disposed between said cam surface and said movable segment and having substantial surface areas in contact at all times with both said cam and movable segment, said fixed segment having an axially extending slot, and means in said slot operable by said cam surface for gripping a strip end.

7. In a reel of the type described, a shaft, means for driving said shaft, a face plate rotatably mounted on said shaft and having an extending lug, a driving lug projecting from said shaft and adapted to have driving engagement with said face plate lug, a fixed segment secured at one end to said face plate and having a drum portion at its opposite end, said drum portion being rotatably mounted on said shaft, a pair of movable segments each supported and guided at one end for movement on an extended radius of said shaft by said face plate and at the other end by said drum portion, a cam rotatable with said shaft and disposed between said face plate and said drum portion, a series of cam surfaces on said cam, a second series of cam surfaces on said cam axially staggered and angularly displaced from said first named series, one of said cam surface series being positioned to move one of said movable segments and the other of said cam surface series being positioned to move the other of said movable segments, load transmitting slippers or shoes between said cam surfaces and said movable segments, said slippers being adapted to have sliding movement relative to said segments, means for maintaining said cam surfaces and segments in engagement with said slippers, said fixed segment having a slot extending axially thereof, a gripper bar supported by said fixed segment and having portions engaging one of said series of cam surfaces whereby movement of said cam surfaces in one direction will move said gripper bar to grip a strip end in said slot, and means for moving said bar to release the strip end when said cam surfaces are moved in the opposite direction.

8. In a reel of the type described, a shaft, means for driving said shaft, a face plate rotatably mounted on said shaft and having an extending lug, a driving lug projecting from said shaft and adapted to have driving engagement with said face plate lug, a fixed segment secured at one end to said face plate and having a drum portion at its opposite end, said drum portion being rotatably mounted on said shaft, a pair of movable segments each supported and guided at one end for movement on an extended radius of said shaft by said face plate and at the other end by said drum portion, a cam rotatable with said shaft and disposed between said face plate and said drum portion, a series of cam surfaces on said cam, a second series of cam surfaces on said cam axially staggered and angularly displaced from said first named series, one of said cam surface series being positioned to move one of said movable segments and the other of said cam surface series being positioned to move the other of said movable segments, load transmitting slippers or shoes between said cam surfaces and said movable segments and adapted to have sliding movement on said segments, means for maintaining said cam surfaces and segments in engagement with said slippers, and a brake for retarding rotation of said segments.

9. In a reel of the type described, a shaft, means for driving said shaft, a face plate rotatably mounted on said shaft and having an extending lug, a driving lug projecting from said shaft and adapted to have driving engagement with said face plate lug, a fixed segment secured at one end to said face plate and having a drum portion at its opposite end, said drum portion being rotatably mounted on said shaft, a pair of movable segments each supported at one end for radial movement by said face plate and at the other end by said drum portion, a cam rotatable with said shaft and disposed between said face plate and said drum portion, a series of cam surfaces on said cam, a second series of cam surfaces on said cam axially staggered and angularly displaced from said first named series, one of said cam surface series being positioned to move one of said movable segments and the other of said cam surface series being positioned to move the other of said movable segments, load transmitting slippers or shoes between said cam surfaces and said movable segments, means for maintaining said cam surfaces and segments in engagement with said slippers, a brake for retarding rotation of said segments, means for applying and releasing said brake, and means for controlling said brake applying means and said shaft driving means whereby said brake will be released after said driving means starts to drive said shaft in reeling direction and will be applied when said driving means is stopped.

10. In a reel of the type described, a plurality of segment members, a shaft, means for supporting said segments on said shaft, one of said segments being fixed insofar as radial movement toward and away from the center of said shaft is concerned, another of said segments being movable on a radial path relative to the center of said shaft, a cam surface carried by said shaft, said cam surface being eccentric relative to the shaft center, a slipper member disposed between said cam surface and said movable segment and having substantial surface areas in contact at all times with both said cam and movable segment, and brake means for restraining said segments from rotational movement while permitting rotational movement of said shaft and cam.

11. In a reel of the type described, a plurality of segment members, a shaft, means for supporting said segments on said shaft, one of said segments being fixed insofar as radial movement toward and away from the center of said shaft is concerned, another of said segments being movable on a radial path relative to the center of said shaft, a cam surface carried by said shaft, said cam surface being eccentric relative to the shaft center, a slipper member disposed between said cam surface and said movable segment and having substantial surface areas in contact at all times with both said cam and movable segment, said fixed segment having an axially extending slot, means in said slot operable by said cam surface for gripping a strip end, and brake means for restraining said segments from rotational movement while permitting rotational movement of said shaft and cam.

12. In a reel of the type described, a shaft, a cam carried by said shaft, a segment member supported on said shaft and adapted to have limited rotational movement relative thereto, said segment having an axially extending slot adapted to receive a strip end, a resiliently backed gripping bar carried by said segment and having a gripping face in said slot, and a movable gripping bar adapted to co-act with said resiliently backed bar to grip a strip end in said slot, said movable gripping bar having portions engaging said cam, spring means tending to move said gripping bars apart, another segment member supported and guided for movement parallel to a radius of said shaft, and cam means on said shaft for moving said last named segment away from said shaft.

13. In a reeling apparatus for strip material, a shaft, a collapsible reel on said shaft, said reel including segments rotatable through a limited degree of movement relative to said shaft, means operable by said relative rotation for effecting expansion of said reel, a motor for driving said shaft, means for progressively accelerating and decelerating said motor from and to its stopped position, a brake effective on said segments to retard rotation thereof, means for applying said brake as said motor is decelerated and maintaining the brake applied while the motor is stopped, and means for releasing said brake after said motor and shaft have started to rotate.

14. In reeling apparatus for strip material, a shaft, a plurality of reel segments mounted on said shaft for limited movement radially and circumferentially of said shaft, cam means on said shaft for moving said segments radially outwardly upon relative rotation of said shaft and segments in one direction, means for limiting the relative rotation of said shaft and segments, brake means for retarding rotation of said segments, means for driving said shaft, means operable by said cam means for gripping the end of a strip, means for starting, stopping and reversing said driving means, brake operating means interconnected with said starting and stopping means whereby said brake is released after the shaft starts to rotate and is applied when said shaft is stopped or reversely rotated, and limit means for limiting the reverse rotation of said driving means to the permitted limited relative rotation of said shaft and segments.

15. Reel mechanism of the type described including a driving motor, control means for starting, stopping and reversing said motor, a shaft driven by said motor, reel segments on said shaft, means for expanding some of said reel segments upon relative rotation of said shaft and segments in one direction, means for collapsing said last named reel segments upon relative rotation of said shaft and segments in the opposite direction, means for braking said reel segments, and brake operating means controlled with said starting, stopping and reversing means whereby said brake is applied when the motor is stopped or reversed and is released after the motor is started in reeling direction.

16. In a reel of the type described, a shaft, a movable segment supported for movement radially of said shaft, resilient means tending to move said segment inwardly toward the shaft center, cam means for moving said segment radially outwardly upon relative rotation of said shaft and segment in one direction and permitting said segment to be moved radially inwardly on relative rotation of said shaft and segment in the opposite direction, and a slipper member between said cam and segment, said slipper having a curved surface engaging a corresponding curved surface on said cam and a flat surface engaging a corresponding flat surface on said segment.

17. In a reel of the type described, a shaft, means for driving said shaft, a face plate rotatably mounted on said shaft and having an extending lug, a driving lug projecting from said shaft and adapted to have driving engagement with said face plate lug, a fixed segment secured at one end to said face plate and having a drum portion at its opposite end, said drum portion being rotatably mounted on said shaft, a pair of movable segments each supported and guided at one end for movement on an extended radius of said shaft by said face plate and at the other end by said drum portion, a cam rotatable with said shaft and disposed between said face plate and said drum portion, a series of cam surfaces on said cam, a second series of cam surfaces on said cam axially staggered and angularly displaced from said first named series, one of said cam surface series being positioned to move one of said movable segments and the other of said cam surface series being positioned to move the other of said movable segments, load transmitting slippers or shoes between said cam surfaces and said movable segments and adapted to have sliding movement on said segments, means for maintaining said cam surfaces and segments in engagement with said slippers, a brake for retarding rotation of said segments, a pusher member supported for movement generally parallel to the axis of said shaft and adapted to engage a coil on the reel, and means for moving said pusher member from a position adjacent said face plate toward said opposite end of said fixed segment.

PERCY W. MATTHEWS.